United States Patent [19]

Outa et al.

[11] Patent Number: 5,293,469
[45] Date of Patent: Mar. 8, 1994

[54] APPARATUS FOR GENERATING A GRAPHIC IMAGE HAVING SYMBOLS WHOSE CENTERS AND ALIGNED WITH EACH OTHER AND WHOSE SIZES ARE ADJUSTED TO ACCORD WITH EACH OTHER

[75] Inventors: Junichi Outa, Yokohama; Leo Macanna, Kawasaki; Takako Satoh; Masashi Nakamura, both of Yokohama, all of Japan

[73] Assignee: Ricoh Company, Ltd., Tokyo, Japan

[21] Appl. No.: 964,529

[22] Filed: Oct. 21, 1992

[30] Foreign Application Priority Data

Oct. 23, 1991 [JP]  Japan ................................. 3-302638

[51] Int. Cl.⁵ ............................................. G06F 15/62
[52] U.S. Cl. ................................... 395/133; 395/136; 395/139; 382/47
[58] Field of Search .................. 395/133, 136–139, 395/140, 141; 382/13, 14, 30, 44–47

[56] References Cited

U.S. PATENT DOCUMENTS

| 4,759,075 | 7/1988 | Lipkie et al. | 382/46 |
| 4,953,106 | 8/1990 | Gansner et al. | 395/141 X |
| 5,111,514 | 5/1992 | Ohta | 382/46 X |
| 5,121,442 | 6/1992 | Togawa et al. | 382/13 |

FOREIGN PATENT DOCUMENTS

| 58-18776 | 2/1983 | Japan | G06K 9/62 |
| 61-877 | 1/1986 | Japan | G06K 9/00 |
| 62-133588 | 6/1987 | Japan | G06K 9/62 |

*Primary Examiner*—Gary V. Harkcom
*Assistant Examiner*—Almis Jankus
*Attorney, Agent, or Firm*—Mason, Fenwick & Lawrence

[57] ABSTRACT

The apparatus provides a way of receiving graphic symbols whose sizes are mutually different, and whose positions are irregularly arranged, such as a handwritten flow chart. For example, the apparatus automatically generates a flow chart image in which sizes of the graphic symbols are adjusted to be balanced, and in which the positions of the centers of the graphic symbols are aligned. First, the apparatus transforms the input graphic image into vectors representing the graphic symbols. Then, a set of symbol parameters are recognized for each graphic symbol. Center positions of the groups of graphic symbols which fall within a predetermined range, are aligned. Also, the heights and widths of the group of graphic symbol are adjusted through use of the symbol parameters. Finally, aligned, size-adjusted graphic symbols are output in an output image.

13 Claims, 20 Drawing Sheets

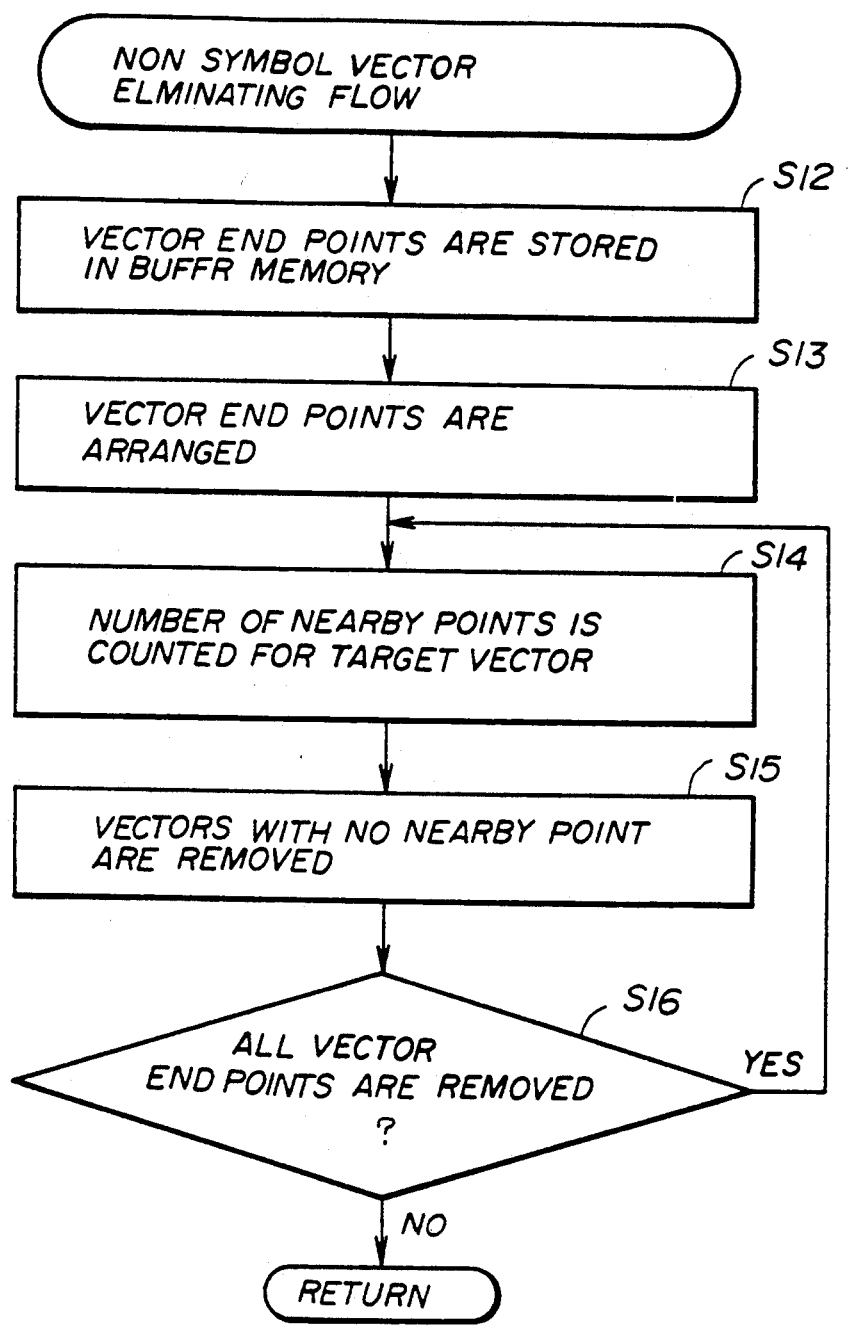

PROCESS type = 1 ;
count-vec = 4 ;
hor = 2 ; ver = 2 ;
heigh/width < 0.9 or heght/width > 1.1

DISCRIMINATION type = 2 ;
count-vec = 4 ;
hor =    ver = 0 ;
par = 2

PREPARATION

```
type = 3;
count-vec = 6;
hor = 0  and  ver = 2;
hor = 2  and  ver = 0;
par = 3
height > 1 and width > 1
```

MANUAL OPERATION

```
type = 5;
count-vec = 4;
hor = 2   or ver = 2;
par = 1;
```

AUXILIARY OPERATION type = 6;
count-vec = 4;
hor = 2;
ver = 2;
$0.9 \leq height/width \leq 1.1$

MERGING type = 7;
count-vec = 3;
hor + ver = 1

EXTRACTION type = 8;
count-vec = 3;
hor + ver = 1

MANUAL
INPUT

```
type = 11;
count vec = 4;
hor = 1 and ver = 2;
hor = 2 and ver = 1;
par = 1;
```

INPUT-
OUTPUT

```
type = 12;
count vec = 4;
hor = 2;
ver = 0;
par = 2;
```

TERMINAL type = 28;
count-vec > 6
$0.9 \leq height \leq 1.1$

TERMINAL parm1 type = 29;
count vec > 6;
height/width < 0.9 or heght/width > 1.1

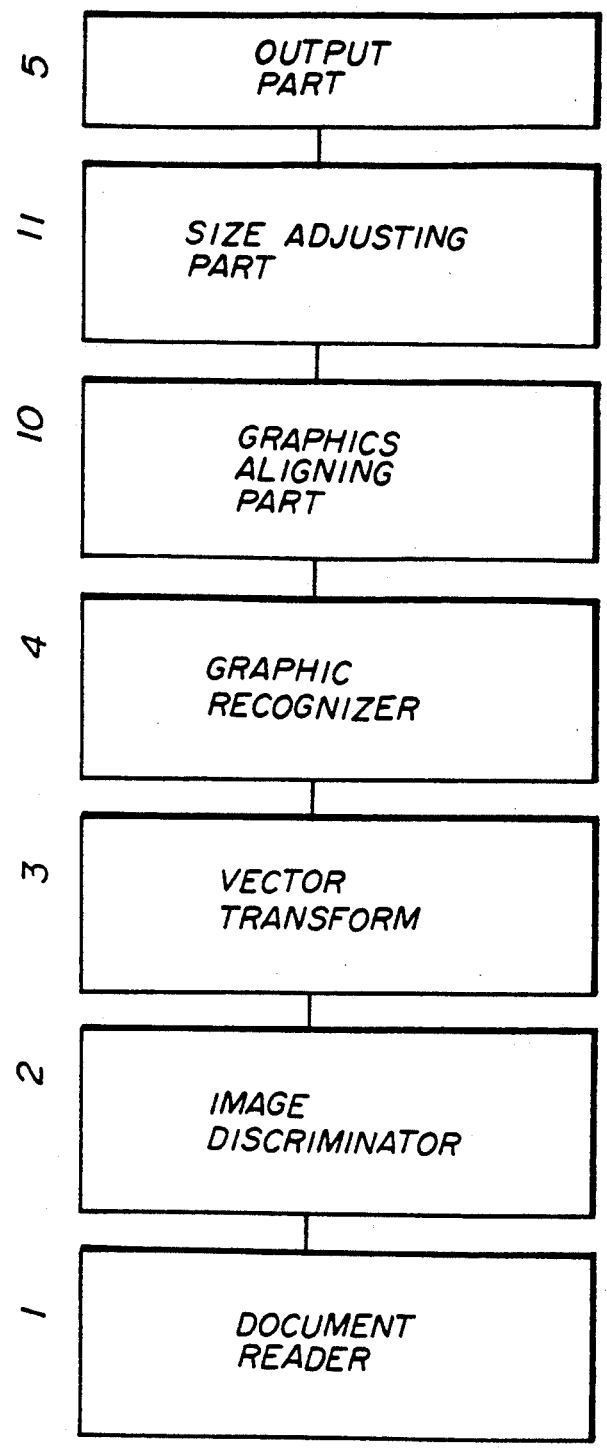

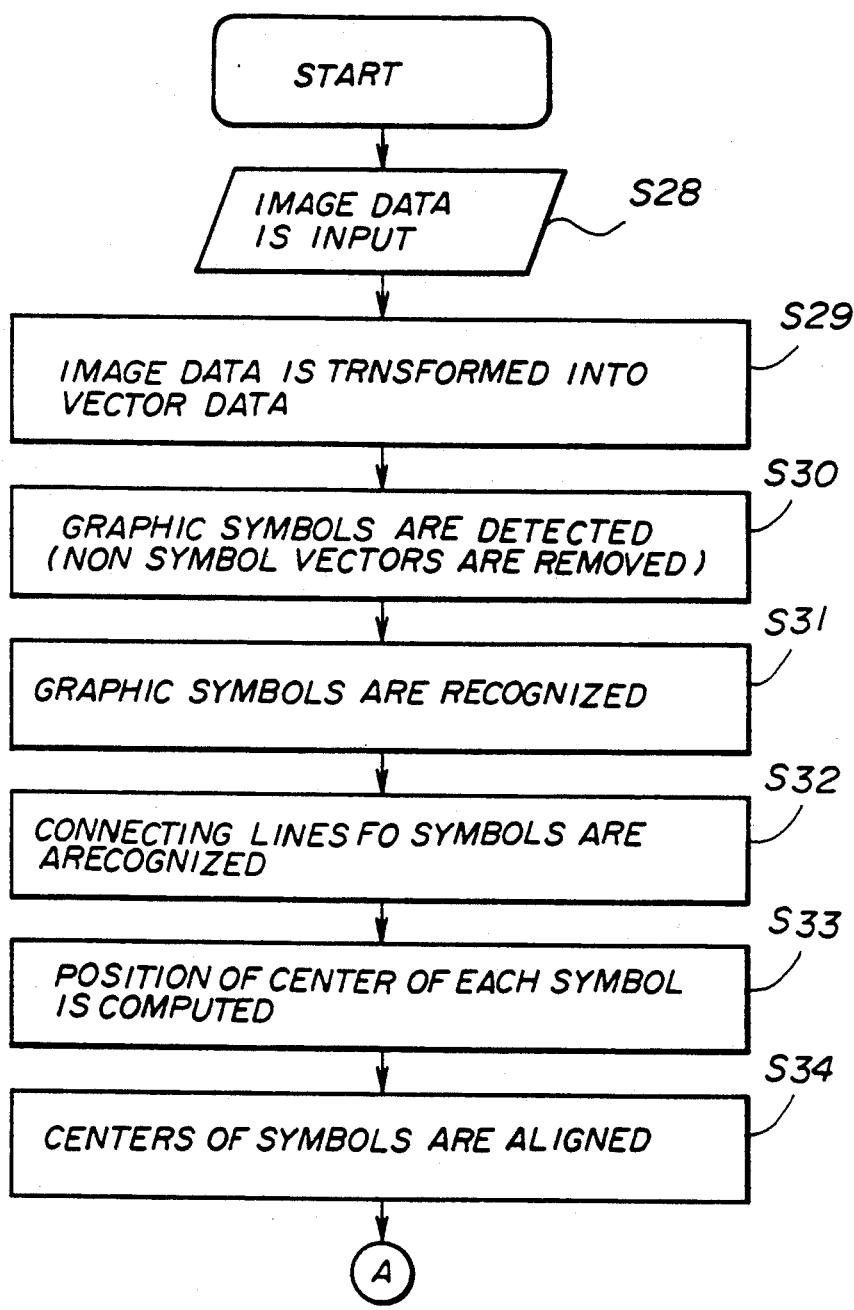

APPARATUS FOR GENERATING A GRAPHIC IMAGE HAVING SYMBOLS WHOSE CENTERS AND ALIGNED WITH EACH OTHER AND WHOSE SIZES ARE ADJUSTED TO ACCORD WITH EACH OTHER

BACKGROUND OF THE INVENTION

The present invention generally relates to an image processing apparatus, and more particularly to an image processing apparatus for generating an image including a number of graphic symbols the sizes of which are well adjusted and the centers of which are aligned with each other, by receiving an input graphics image, especially a manually drawn flowchart image. This apparatus is applicable to digital printers, facsimile machines, digital copiers or the like.

There conventionally are several image recognition methods and systems for recognizing a configuration of an image produced by transforming an image signal obtained by raster scanning through an image processing procedure. The conventional techniques as mentioned above are disclosed, for example, in Japanese Laid-Open Patent Publication Nos. 54-154935, 55-83972, 56-59374, 56-105567, 59-52384, and 60-24681. Other methods for recognizing a configuration of a graphic image taken from a bit map image, the bit map image being transformed into a vector data and the graphic image being taken from the vector data, are disclosed in Japanese Laid-Open Patent Publication Nos. 56-105580, 57-25083, 57-150075, 58-18776, 58-24974, 59-24974, 59-22175, 59-22178, 61-877, 60-45887, 60-142486, 61-74078, 61-74079, 61-182183, 61-208171, and 62-133588.

Among the publications mentioned above, Japanese Laid-Open Patent Publication No. 58-18776 discloses a method for recognizing a configuration of a graphic image wherein distances between the graphic image center and the graphic image edge points are computed for each angular direction around the center, and wherein the image configuration is recognized from differentials of a function indicating the relationship between the computed distances and the angular directions.

Also, Japanese Laid-Open Patent Publication No. 61-877 discloses a method for recognizing a configuration of a graphic image wherein edge points of an outline are taken from a bit map image, and the image configuration is recognized from a function indicating the relationship between the edge positions and the image density values. Japanese Laid-Open Patent Publication No. 62-133588 discloses an image recognition device wherein intersecting points and connecting points in a graphic image are detected, and a small region of the image containing the detected points is compared with a standard pattern in a dictionary stored in a memory so as to recognize the configuration of the graphic image.

However, in the conventional techniques, it is difficult to output an image including graphic symbols whose sizes are balanced with each other and whose centers are aligned, from a roughly written input flowchart image by making use of the conventional apparatus. In order to achieve such a function with the existing image recognition apparatus, installing a complicated program in a computer system is required. Also, the users must acquire the knowledge of computer graphics and the skill of computer operations. In the meantime, the work of developing a flowchart by hand or manually drawing a diagram using a ruler or template is time consuming and troublesome to the users. Therefore, it is desirable to receive a manually written flowchart image including a set of graphic symbols whose sizes and position are irregularly arranged, and automatically generate a flowchart image in which the sizes of the graphic symbols are adjusted to a balanced condition and the positions of the centers thereof are aligned suitably.

SUMMARY OF THE INVENTION

Accordingly, it is a general object of the present invention to provide an improved image processing apparatus in which the above described problems are eliminated.

Another, more specific object of the present invention is to provide an image processing apparatus which receives an input graphic image, and automatically generates a graphic image including a set of graphic symbols whose sizes are well balanced and whose centers are aligned with each other. The above mentioned object of the present invention is achieved by an image processing apparatus which includes a first transforming part for transforming an input graphic image into a plurality of vector data defining a plurality of graphic symbols in the input graphic image, each item of vector data having coordinates indicating positions of two end points of the vector, an angle indicating an angular direction of the vector, and a width indicating a line width of the vector, a first storage part for storing the plurality of vector data from the first transforming part, a recognizing part for recognizing a configuration of each graphic symbol in the input graphic image from the plurality of vector data stored in the first storage part, the recognizing part producing a set of symbol parameters with respect to each graphic symbol whose configuration is recognized, the set of symbol parameters indicating at least a type of each graphic symbol, a center position thereof, a height thereof, and a width thereof, a second storage part for storing the set of symbol parameters produced by the recognizing part, an aligning part for taking a group of graphic symbols with the symbol parameters respectively indicating a center position falling within a predetermined range, from the second storage part and for aligning the center of each graphic symbol of the group so as to accord with an average value of the center positions of the symbols of the group, a size adjusting part for taking a group of graphic symbols with the symbol parameters respectively indicating a height and a width both falling within a predetermined range, from the second storage part and for adjusting a size of each graphic symbol of the group so as to accord with an average size of the symbols of the group, and an output part for outputting a graphic image generated by the aligning part and the size adjusting part in the second storage part. According to the image processing apparatus of the present invention, the size adjusting part adjusts the size of each graphic symbol so as to accord with the average size and the aligning part aligns the position of the center of each graphic symbol so as to accord with the average center position, thus generating an image with the graphic symbols whose sizes are well balanced and whose centers are aligned with each other.

Other objects and further features of the present invention will become apparent from the following detailed description when read in conjunction with the accompanying drawings.

BRIEF DESCRIPTION OF THE DRAWINGS

FIG. 3 is a flowchart for explaining a non-symbol vector eliminating procedure;

FIG. 8 is a block diagram showing an image processing apparatus of a second embodiment of the present invention;

FIGS. 9A and 9B are a flowchart for explaining a flowchart generating procedure performed by the image processing apparatus shown in FIG. 8;

DESCRIPTION OF THE PREFERRED EMBODIMENTS

Figure 1:
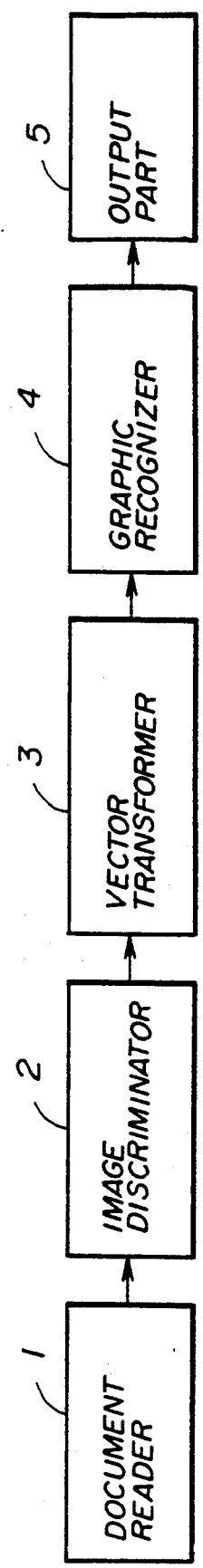
FIG. 1 is a block diagram showing an image processing apparatus to which a first embodiment of the present invention is applied.

A description will now be given, with reference to FIG. 1, of a first embodiment of an image processing apparatus according to the present invention. FIG. 1 shows the construction of a digital copying machine to which the present invention is applied. In the apparatus shown in FIG. 1, a document reader 1 reads an image from an original document by illuminating the document by a light beam emitted from a light source of the document reader. The image read by the document reader 1 is converted into a bi-level (black-and-white) image data, and the bi-level image is stored in a buffer memory at the document reader 1.

An image discriminator 2 shown in FIG. 1 detects whether the image stored in the buffer memory is a character image or a graphic image. When the image discriminator 2 detects that the stored image is a graphic image, a vector transformer 3 extracts the graphic image from the buffer memory, and it transforms the extracted image into a set of vector data. Each item of vector data includes a start point coordinate value, an end point coordinate value, an angular direction value and a width value. Each graphic symbol in the input graphic image is defined by the set of vector data thus produced by the vector transformer 3. The set of vector data of the vector transformer 3 is compressed through known decoding before the subsequent processes are performed.

A graphic recognizer 4 detects whether the vector transformed by the image transformer 3 is a line element or a circle element. Such graphic element data generated by the graphic recognizer 4 is stored in a memory at the graphic recognizer 4. A graphic output part 5 records the graphic element data (stored in the memory) on a copy sheet together with character image data by synthesizing the graphic element data and combining with the character image data.

More specifically, the graphic recognizer 4 detects a closed-loop graphic symbol from a plurality of graphic symbols defined by the set of vector data of the vector transformer 3. When a closed-loop graphic symbol is formed by the set of vector data, it can be assumed that the graphic element (especially a line segment) defined by one vector is connected at one end point of the graphic element to another graphic element defined by another vector. Thus, a vector having no adjacent vector connected at one end point is detected as being a non-symbol vector which does not form part of a closed-loop graphic symbol. The above described procedure is repeated until all the graphic symbols in the input image are checked. Then, non-symbol vectors are eliminated from the set of vector data produced by the vector transformer 3, and only symbol vectors which form part of the closed-loop graphic symbol are extracted by the graphic recognizer 4.

There is an exception to the above described assumption which is used when non-symbol vector elimination steps are performed. If three graphic elements defined by some vectors of the vector transformer 3 intersect at their end points, the vectors defining the graphic elements cannot simply be taken as a non-symbol vector or a symbol vector. This exceptional case must be excluded when the graphic recognizer 4 extracts the symbol vector data. According to the present invention, only when two graphic elements defined by two adjacent vectors are connected to each other at their end points are the vectors taken as the symbol vectors. However, when two graphic elements defined by two vectors intersect each other at one of their intermediate points, it is taken that the vectors are not connected to each other.

Figure 2A:
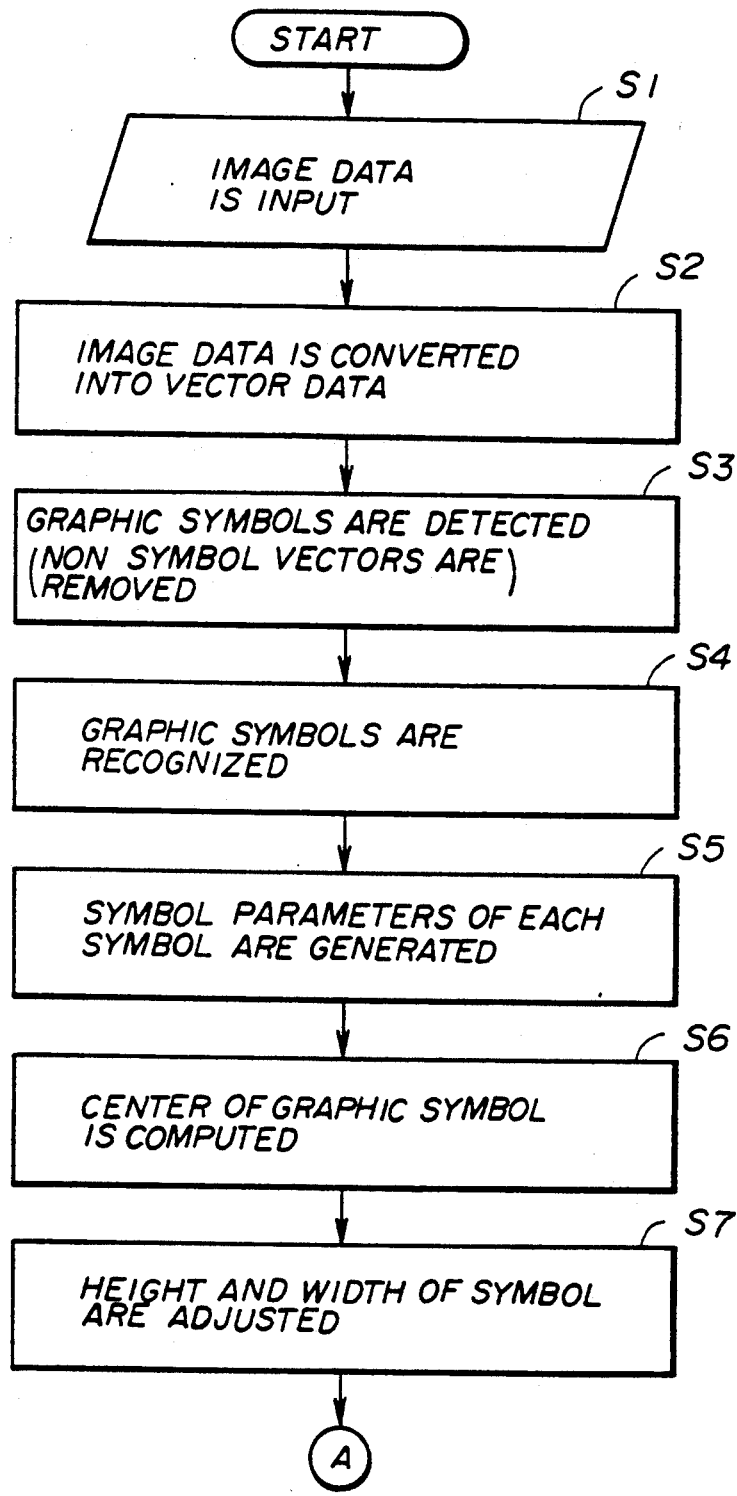
FIGS. 2A and 2B are a flowchart for explaining a flowchart generating procedure performed by the image processing apparatus shown in FIG. 1.
Figure 2B:
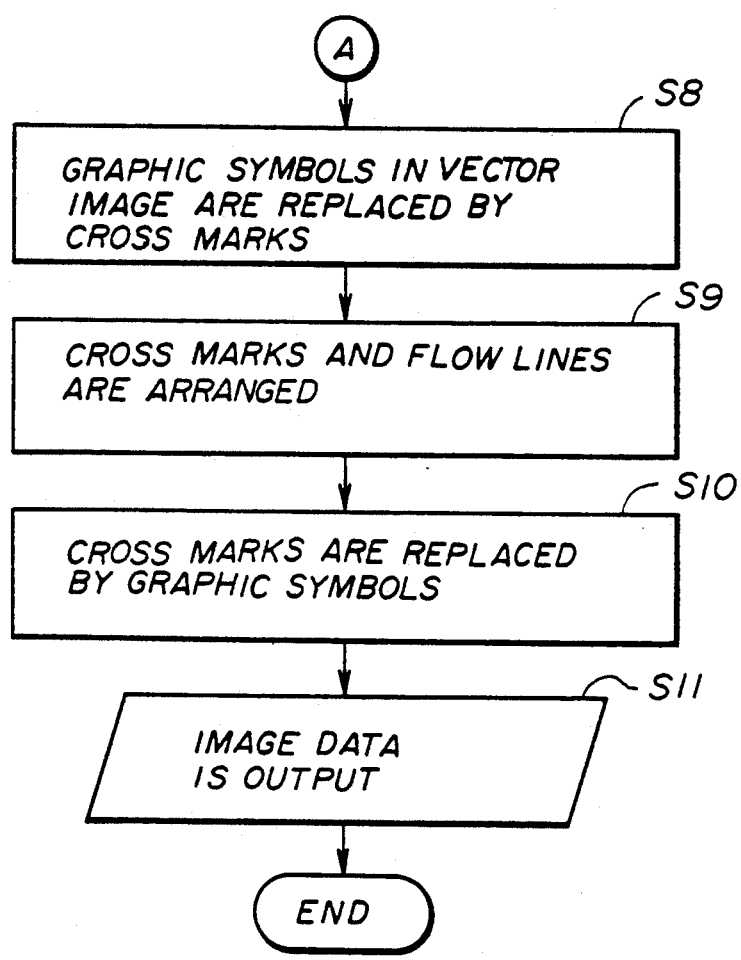

FIGS. 2A and 2B show a flowchart generating procedure performed by the image processing apparatus of the present invention shown in FIG. 1. In step S1 shown in FIG. 2A, image data describing a manually drawn flowchart image from a scanned document is input by the document reader 1. In step S2, the graphic image data is converted into a set of vector data by the vector transformer 3, and the set of vector data is stored in the buffer memory.

In step S3, a sequence of non-symbol vector eliminating steps (which will be described below in more detail) is performed by the graphic recognizer 4. In this step S3, non-symbol vectors whose flags are switched ON are removed from the set of vector data stored in the buffer memory. Also, vectors defining a set of flow lines of the input image are removed from those stored in the buffer memory. Then, the remainder of the vector data in the buffer memory is taken as being symbol vectors defining graphic symbols of the input image. Each graphic symbol is detected from the set of vector data after the above sequence is performed.

In step S4, the configuration of each graphic symbol is recognized. In step S5, symbol parameters of each graphic symbol whose configuration is recognized in step S4 are generated. The symbol parameters are in a form acceptable to an output device. In step S6, the coordinate values of the center of each graphic symbol are computed. In step S7, the height and width of each graphic symbol are adjusted, so that the symbol heights and widths are in accordance with the average value or the maximum value.

In step S8 shown in FIG. 2B, the respective symbol vectors in the input image are replaced by cross marks "+". A set of flow lines in the input image is inserted so as to connect the cross marks. In step S9, the cross marks and flow lines of the input image are arranged such that the positions of the centers of the cross marks are aligned. In step S10, the cross marks are replaced by the graphic symbols. In step S11, the set of vector data is transformed to the original form of the image data, and the thus generated flowchart image is output to an image memory or recorded on a copy sheet.

FIG. 3 shows the sequence of non-symbol vector eliminating steps which correspond to the step S3 performed within the flowchart generating procedure shown in FIG. 2A. In step S12 of the non-symbol vector eliminating flow shown in FIG. 3, x and y coordinate values of an end point of each item of the vector data are extracted from the buffer memory. In the buffer memory, the x and y coordinate values of each end point, a vector count value "NUM-JP", a flow value "ST" and a pointer value "PT" with respect to each of the vector data are stored. In step S13, the end points of the vector data are arranged in ascending order of the x coordinate value. This arrangement is made in order to increase the speed of performing the non-symbol vector eliminating procedure.

In step S14, the number of nearby end points located within a prescribed distance from the end point of the target vector data in the buffer memory is counted with respect to the target vector data. This step is repeated until all the end points in the buffer memory are checked. The number of nearby end points thus counted is set to a corresponding counter "NUM-JP" of the target vector.

Step S15 detects whether or not the vector count value "NUM-JP" of the target vector is equal to 0. If the vector count data "NUM-JP" is equal to 0, a flag at one end point of the target vector and a flag at the other end point thereof are switched ON in step S15, so that the vector with the vector count value "NUM-JP"=0 is eliminated from the buffer memory. Step S16 detects whether or not all the vector end points in the buffer memory have been checked. If all the vector end points have been checked, the flow of the non-symbol vector eliminating steps shown in FIG. 3 is completed, and control is returned to the step S4 shown in FIG. 2A.

Figure 6A:
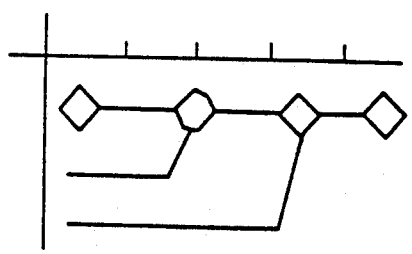
FIGS. 6A through 6C are diagrams for explaining changes of another flowchart image when an exceptional case of the non-symbol vector eliminating procedure is performed.
Figure 6B:
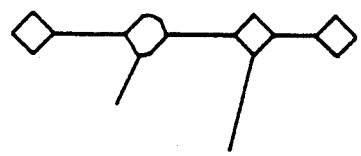
Figure 6C:
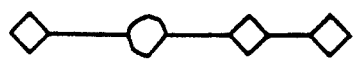

FIGS. 5A through 5E show changes in a manually drawn input flowchart image whose changes are effected by the image processing apparatus when the non-symbol vector elimination is performed. As shown in FIGS. 5A through 5E, the non-symbol vectors are removed and the symbol vectors are grouped into sets of vectors each of which separately defines a closed-loop graphic symbol in the input flowchart image. FIGS. 6A through 6C show changes of another input flowchart image when the non-symbol vector eliminating flow of the exceptional case is performed. In the case shown in FIGS. 6A through 6C, three graphic elements defined by the vector data intersect at their end points, such vector data remain unchanged after non-symbol vector elimination and are subjected to the subsequent processes. The reason for the above procedure is that the vectors defining three graphic elements having a common end point cannot be simply taken as a non-symbol vector or a symbol vector.

Figure 4:
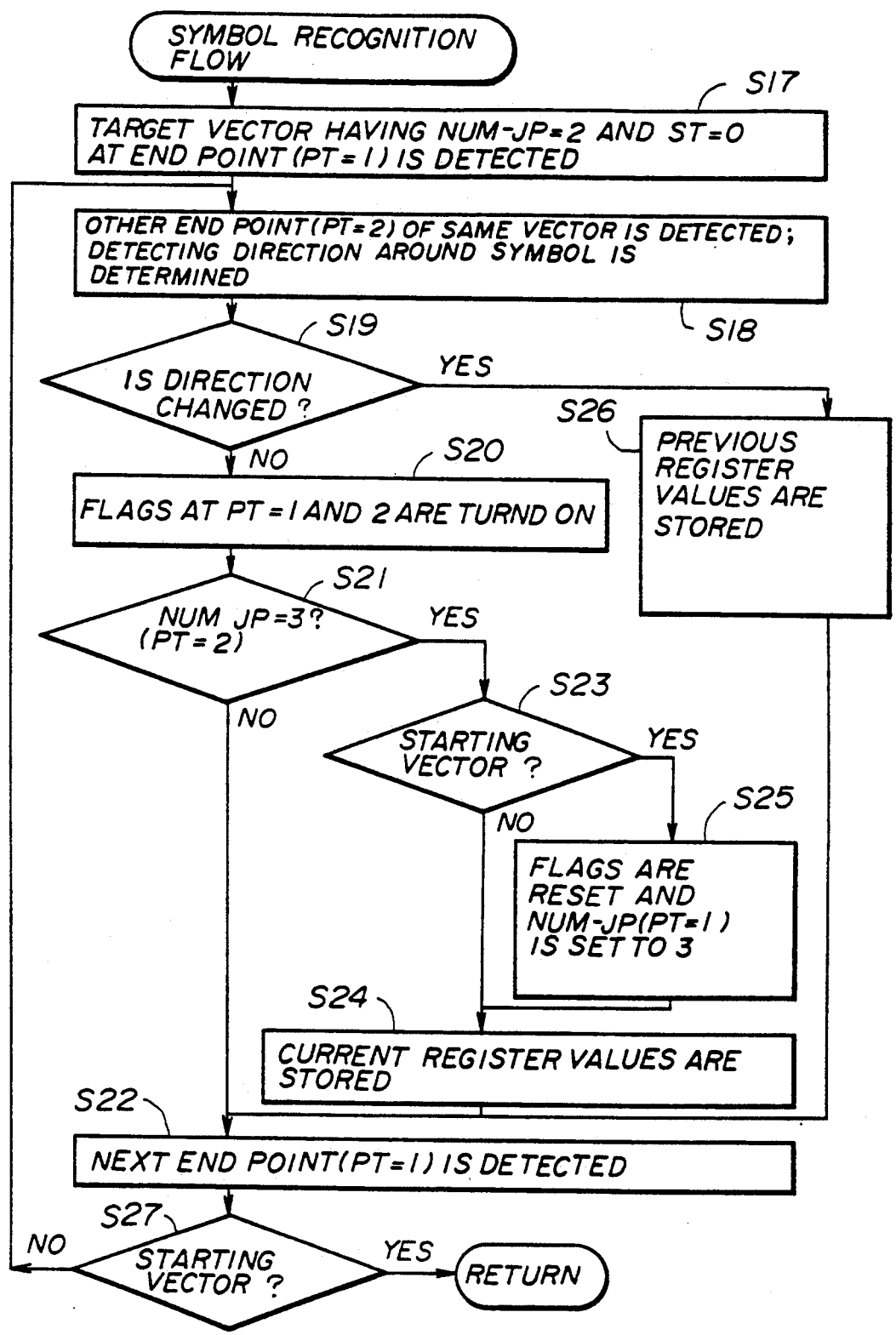
FIG. 4 is a flowchart for explaining a symbol recognizing procedure performed within the procedure shown in FIGS. 2A and 2B.
Figure 5A:
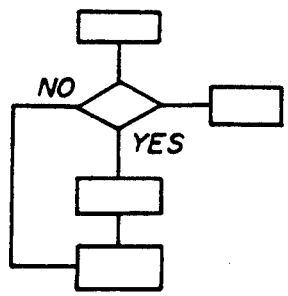
FIGS. 5A through 5E are diagrams for explaining changes of a flowchart image when the non-symbol vector eliminating procedure is performed.
Figure 5B:
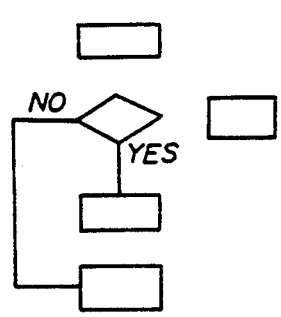
Figure 5C:
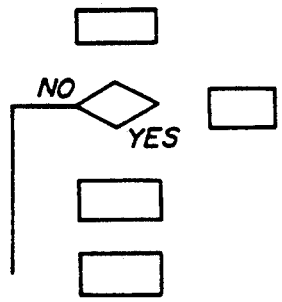
Figure 5D:
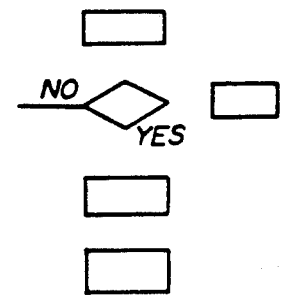
Figure 5E:
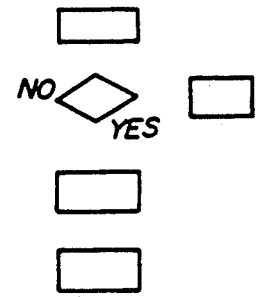

FIG. 4 shows a symbol recognition procedure which corresponds to the step S4 performed within the flowchart generating flow shown in FIG. 2A. After all the non-symbol vector data whose flags are switched ON are eliminated, the maximum x coordinate value, the minimum x coordinate value, the maximum y coordinate value, and the minimum y coordinate value are easily computed from the coordinates values of the end points with respect to a set of vector data defining the configuration of a graphic symbol. By using these coordinate values, x and y coordinate values of the center of each graphic symbol, x and y coordinate values of the height thereof, and x and y coordinate values of the width thereof are determined.

In step S17 of the sequence shown in FIG. 4, a target vector having an end point whose flag is switched OFF is detected from the buffer memory. It is necessary to search for a vector having both end points connected to the end points of other adjacent vectors where the flags at the end points of those vectors are switched OFF. Thus, in step S17, the target vector having a vector count value NUM-JP=2 and a flag value ST=0 at one end point (PT=1) is found in the buffer memory. In step S18, the other end point (PT=2) of the target vector is checked whether or not it has a flag value ST=0. Also, in step S18, another end point of another vector which is located nearest to the target vector is detected, and a detecting direction is determined by checking whether it is a clockwise direction around the center of the graphic symbol or an anti-clockwise direction.

Step S19 detects whether or not the detecting direction detected in step S18 is different from the previous detecting direction. If the detecting direction is not different, the flags at the end points (PT=1 and 2) of the target vector are switched ON in step S20, which indicates the target vector as being a non-symbol vector. Step S21 detects whether or not the vector count value NUM-JP at the end point (PT=2) of the target vector is equal to 3. If the value NUM-JP is not equal to 3, an end point (PT=1) of a next target vector adjacent to the current target vector in the graphic symbol is checked in step S22. Step S27 detects whether or not the target vector has returned to the starting vector detected in step S17. The above described processes are repeated until the starting vector appears in the closed-loop graphic symbol.

If it is detected in step S21 that the vector count value NUM-JP at the end point (PT=2) of the target vector is equal to 3, step S23 detects whether or not the target vector is the same as the starting vector detected in step S17. If the target vector is not the starting vector, the current register values are stored in step S24. If it is detected in step S23 that the target vector is the same as the starting vector, the flag is reset to zero (or switched OFF) and the vector count value NUM-JP at the end point (PT=1) is set to 3 in step S25.

If it is detected in step S19 that the detecting direction is changed incorrectly, the registers are set to the previous values, and the flags at the end points of the three vector data are switched ON in step S26. The vector data whose flags are switched ON are eliminated from the buffer memory. The above described symbol recognition procedure is repeated until all the graphic symbols in the input image have been checked.

In step S5 of the procedure shown in FIG. 2A, the symbol parameters with respect to each graphic symbol whose configuration is recognized are generated. These symbol parameters are necessary to accurately define the final form of each graphic symbol of the output flowchart image. According to the present invention, in order to provide accurate information to identify each graphic symbol of the output image in the final form, the following element data are used to describe the symbol parameters described above.

xc (2 bytes): x coordinate of the center of the graphic symbol;
yc (2 bytes): y coordinate of the center of the graphic symbol;
xl (2 bytes): width of the graphic symbol (the length thereof in x-axis direction);
yl (2 bytes): height of the graphic symbol (the length thereof in y-axis direction);
offset (2 bytes): value of an address pointer pointing to one of a group of vectors describing the graphic symbol;
line-wdt (2 bytes); average width of each line segment forming the graphic symbol;
parm1 (2 bytes): preliminary parameter
count-vec (1 byte): number of vectors completely forming the graphic symbol;
type (1 byte): identifier identifying the type of the graphic symbol;
par (1 byte): number of parallel lines in the graphic symbol;
hor (1 byte): number of horizontal lines in the graphic symbol;
ver (1 byte): number of vertical lines in the graphic symbol;
height/width (2 bytes), ratio of the symbol height to the symbol width.

In the symbol detection in step S3 of the sequence shown in FIG. 2A, the set of vector data defining the configuration of the graphic symbol is taken from the buffer memory, and the pointer PT of each vector is set to a value indicated by the element data "count-vec" and "offset" of the vector. The remaining areas of the buffer memory are used to recognize the configuration of the graphic symbol.

Figure 7A:
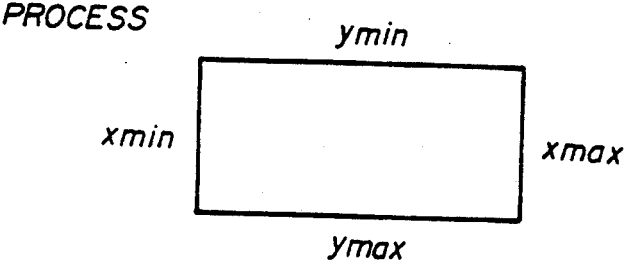
FIGS. 7A through 7K are diagrams showing various symbol parameters with respect to different graphic symbols which are recognizable in the flowchart generating procedure shown in FIGS. 2A and 2B.
Figure 7B:
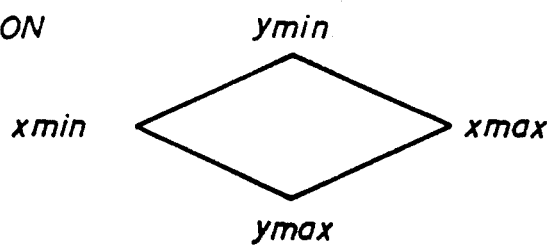
Figure 7C:
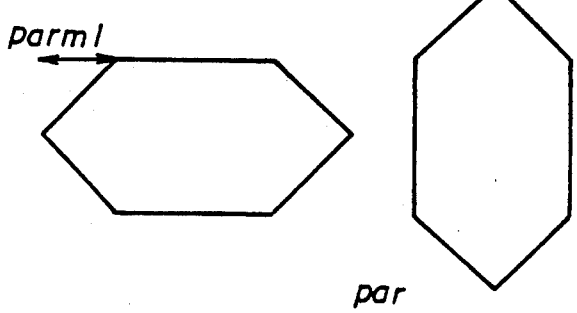
Figure 7D:
Figure 7E:
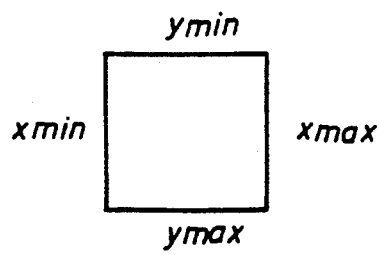
Figure 7F:
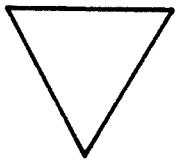
Figure 7G:
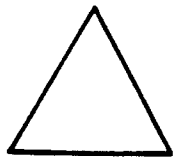
Figure 7H:
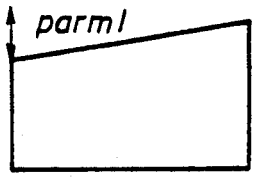
Figure 7I:
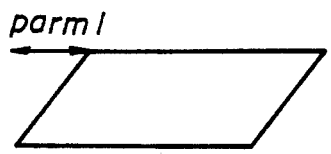
Figure 7J:
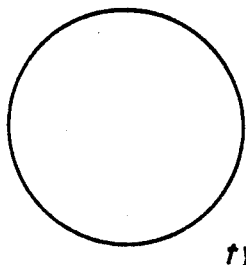
Figure 7K:
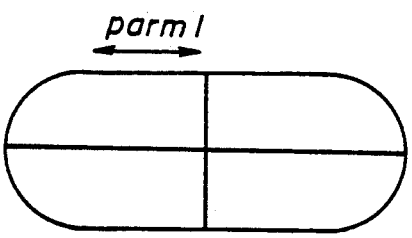

FIGS. 7A through 7K show several graphic symbols which are recognizable in the flowchart graphic making steps described above, and the corresponding symbol parameters of each graphic symbol stored in the memory are also shown. FIG. 7A shows the "process" graphic symbol which is a rectangle, and the type identifier of this symbol is 1. FIG. 7B shows the "decision" graphic symbol which is a lozenge, and the type identifier is 2. FIG. 7C shows the "preparation" graphic symbol which is a polygon, and the type identifier is 3. FIG. 7D shows the "manual operation" graphic symbol which is an inverted trapezoid, and the type identifier is 5. FIG. 7E shows the "auxiliary operation" graphic symbol which is a square, and the type identifier is 6. FIG. 7F shows the "merging" graphic symbol which is an inverted triangle, and the type identifier is 7. FIG. 7G shows the "extraction" graphic symbol which is a triangle, and the type identifier is 8. FIG. 7H shows the "manual input" graphic symbol which is a trapezoid, and the type identifier is 11. FIG. 7I shows the "input-output" graphic symbol which is a parallelogram, and the type identifier is 12. FIG. 7J shows the "terminal" graphic symbol which is a circle, and the type identifier is 28. FIG. 7K shows the "end terminal" graphic symbol which is an ellipse, and the type identifier is 29.

In step S7 of the sequence shown in FIG. 2A, the height and width of each graphic symbol are adjusted. This size adjusting process will now be described in more detail. In this process, 1) the value of the height of each graphic symbol and the value of the width thereof are taken from the buffer memory, 2) the heights and widths of all the graphic symbols included in the input image are respectively arranged in ascending order of the height value and width value, 3) the graphic symbols of the input image are grouped into sets of graphic symbols whose height or width values approximate one another, and 4) the height values or width values of the respective graphic symbols of the same group are adjusted so as to be in accordance with the average height value of the group (or the maximum height value) or the average width value of the group (or the minimum width value of the group). In order not to cause interference between the symbol edges and the characters within the symbols, the height values and the width values of the graphic symbols of one group after the adjustment is performed must be smaller than the maximum height value and the maximum width value of that group, respectively.

In step S8 shown in FIG. 2B, each graphic symbol defined by the vector data stored in the buffer memory is replaced by a cross mark in order to enable the positions of the centers of the graphic symbols in the output image to be easily rearranged. The position of the center of this cross mark and the size thereof are respectively determined in accordance with the position of the center of each graphic symbol computed in step S6 and the size thereof adjusted in step S7. A set of flow lines needed in the output image are drawn so as to connect the thus inserted cross marks.

In step S9 shown in FIG. 2B, the cross marks and flow lines thus inserted are arranged in a manner such that the center positions of the cross marks are aligned with each other. The cross marks after the arrangement will be later replaced by the corresponding graphic symbols. This arrangement procedure will now be described in more detail. In this step, 1) the x coordinate value of the center of each cross mark is taken from the buffer memory, 2) the x coordinate values of the centers of the cross marks thus taken are arranged in ascending order, 3) the cross marks are divided into groups of cross marks whose centers are located within a predetermined reference range, or the x coordinates of the centers of each group having values similar to each other, and 4) all the x coordinate values of the centers of the cross marks of one group are adjusted so as to be equal to the average of the x coordinates of the cross mark centers of that group.

Next, a description will be given of a second embodiment of the present invention, with reference to FIGS. 8 through 15. FIG. 8 shows an image processing apparatus to which the second embodiment of the present invention is applied. In this image processing apparatus, a graphics aligning part 10 and a size adjusting part 11 are provided in addition to the above mentioned components of the apparatus shown in FIG. 1. The graphics aligning part 10 of this embodiment computes the coordinate values of the centers of the graphic symbols whose configuration is recognized by the graphic recognizer 4, and aligns the centers of the graphic symbols with each other based on the computed center coordinate values. The size adjusting part 11 divides the graphic symbols into groups of graphic symbols whose heights or widths have values similar to each other, and adjusts the sizes (the heights and widths) of the graphic symbols of one group so as to accord with the average size of that group. Similarly to the first embodiment, the non-symbol vectors are removed from those stored in the buffer memory of this embodiment.

Figure 9B:
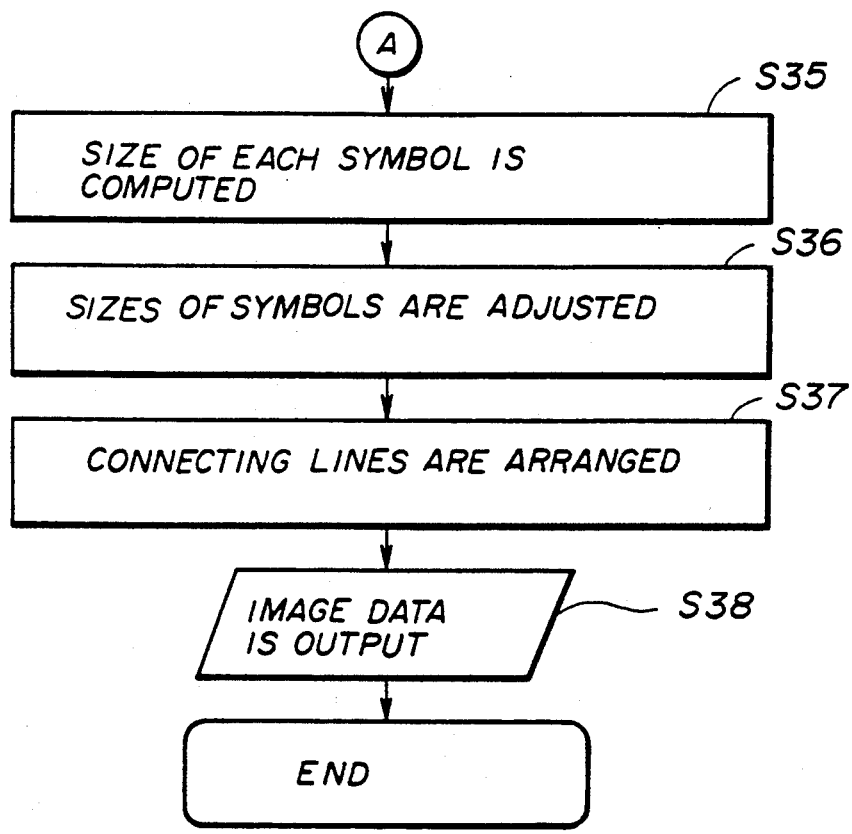

FIGS. 9A and 9B show a flowchart generating procedure performed by the apparatus shown in FIG. 8. In step S28 shown in FIG. 9A, image data describing a manually drawn image is input by the document reader 1. In step S29, the input image data is transformed into a plurality of vectors by the vector transformer 3, and the vectors are stored in the buffer memory.

In step S30, the non-symbol vector eliminating procedure (which is the same as that shown in FIG. 3) is performed by the graphic recognizer 4, so that each non-symbol vector whose flag is switched ON is removed from the buffer memory. Also, flow lines are eliminated from the buffer memory. Then, the remaining vectors of the buffer memory are divided into groups of vectors, each group of vectors defining one graphic symbol of the input image data. Thus, each graphic symbol of the input image data is detected from the groups of vectors after the grouping is performed.

In step S31, the configuration of each graphic symbol of the input image is recognized. In step S32, connecting lines or flow lines connected to the graphic symbols are recognized. In step S33, the coordinate values of the center of each graphic symbol whose configuration is recognized in step S3 are computed. In this step S33, the average value (x and y) of the maximum coordinate value and the minimum coordinate value of each graphic symbol is determined, and this average value is the center value (x and y) between the maximum and minimum coordinates of that graphic symbol. In step S34, the positions of the centers of the graphic symbols are aligned with each other by the graphics aligning part 10.

In step S35 shown in FIG. 9B, the height and width of each graphic symbol are computed from the groups of vectors of the buffer memory, and thus the size of each graphic symbol is determined. In step S36, the heights and widths of the graphic symbols are adjusted by the size adjusting part 11. In step S37, the connecting lines of each graphic symbol are arranged in accordance with the adjusted size of each graphic symbol. In step S38, the vectors of the buffer memory are transformed to the original form of the image data, and an image with the graphic symbols whose centers are aligned with each other by the graphics aligning part 10 and whose sizes are balanced with each other by the size adjusting part 11 is output to an image memory, or it is recorded on a copy sheet by the output part 5.

The graphics aligning process which corresponds to the step S34 shown in FIG. 9A will now be described in more detail. In this process, 1) values of x and y coordinates of the center of each graphic symbol are taken from the buffer memory, 2) the values of the positions of the graphic symbol centers are arranged in ascending order, 3) the graphic symbols are grouped into sets of graphic symbols, the centers of graphic symbols of one group being located within a predetermined distance from each other, and 4) the positions of the centers of the graphic symbols of the group are adjusted so as to accord with the average center position of that group (or, the average x coordinate value and the average y coordinate value of the center positions of the group).

Figure 10A:
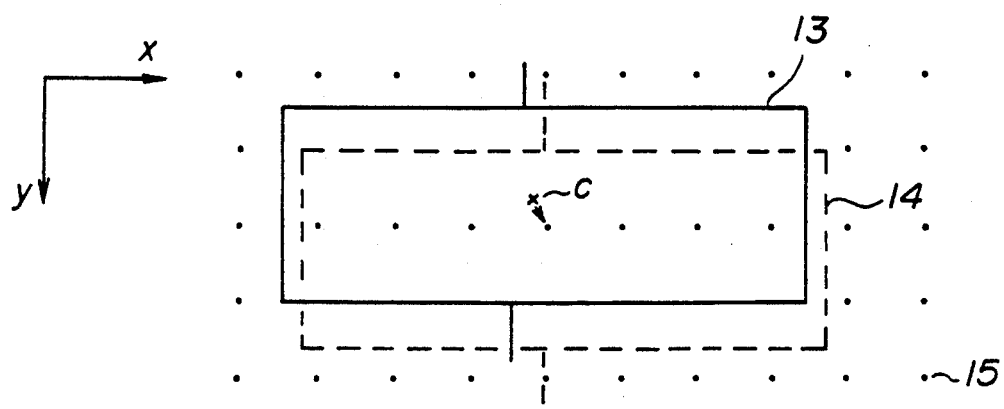
FIGS. 10A and 10B are diagrams for explaining a graphics aligning procedure.
Figure 10B:
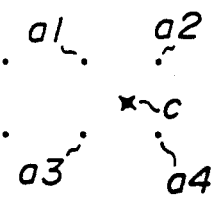

In the meantime, the graphics aligning part 10 of the second embodiment carries out a graphics aligning process different from the above described process. In the graphics aligning process of the second embodiment, the positions of the graphic symbol centers are aligned by the graphics aligning part 10 in accordance with predetermined grid points. FIGS. 10A and 10B show such a graphics aligning process of the second embodiment. In FIG. 10A, an input rectangular graphic image 13 indicated by a solid line, an output rectangular graphic image 14 indicated by a dotted line, and a plurality of grid points 15 horizontally and vertically arrayed with a uniform distance therebetween, are shown. When the graphics aligning process is performed, the input image 13 is moved to the output image 14 so that the center "c" of the graphic image is aligned so as to accord with the nearest grid point. FIG. 10B shows the center "c" of the graphic image, and a set of grid points a1 through a4 located adjacent to the center point "c".

Figures 11A, 11B:
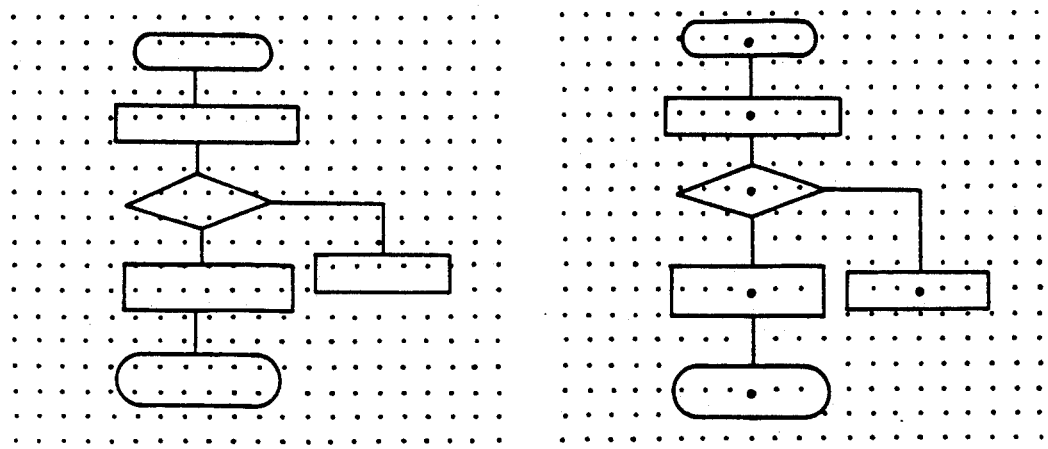
FIGS. 11A and 11B are diagrams showing an input image and an output image produced when the graphics aligning procedure is performed.

FIGS. 11A and 11B respectively show an input flowchart image and an output flowchart image generated when the graphics aligning process is performed. As shown in FIG. 11B, the position of the center of each graphic symbol of the flowchart image is aligned so as to accord with the nearest grid point.

The graphics aligning process of the second embodiment as mentioned above will now be described in more detail. First, the maximum and minimum x coordinate values (xmax, xmin) of each graphic symbol, and the maximum and minimum y coordinate values (ymax, ymin) thereof are taken from the buffer memory. The x and y coordinate values of the center "c" of the graphic symbol are computed as follows.

$$x \text{ coordinate of center} = (xmax - xmin)/2 + xmin$$

$$y \text{ coordinate of center} = (ymax - ymin)/2 + ymin$$

Next, a set of nearby grid points "a1" through "a4" located in the vicinity of the center "c" of the graphic symbol whose position is computed are taken as shown in FIG. 10B. The distance between the symbol center "c" and each of the nearby grid points "a1" through "a4" is smaller than a predetermined distance between the two grid points. The respective distances between the symbol center "c" and the grid points "a1" through "a4" are computed, and the coordinate values of the nearest grid point among those points are determined. The position of the center of the graphic symbol is thus adjusted so as to accord with the position of the nearest grid point. The position of the symbol center is determined by subtracting the difference between the coordinate value of the symbol center and the coordinate value of the nearest grid point from the vector data of the graphic symbol.

In the symbol size computing process in step S35 shown in FIG. 9B, the height and width of each graphic symbol are computed from the vector data in the buffer memory, and the size of each graphic symbol is determined. In the symbol size adjusting process in step S36, the heights and widths of the graphic symbols of one group are adjusted in a manner such that each of the edge points (vertexes) of the graphic symbol is changed to the nearest grid point among the plurality of grid points.

Figure 12:
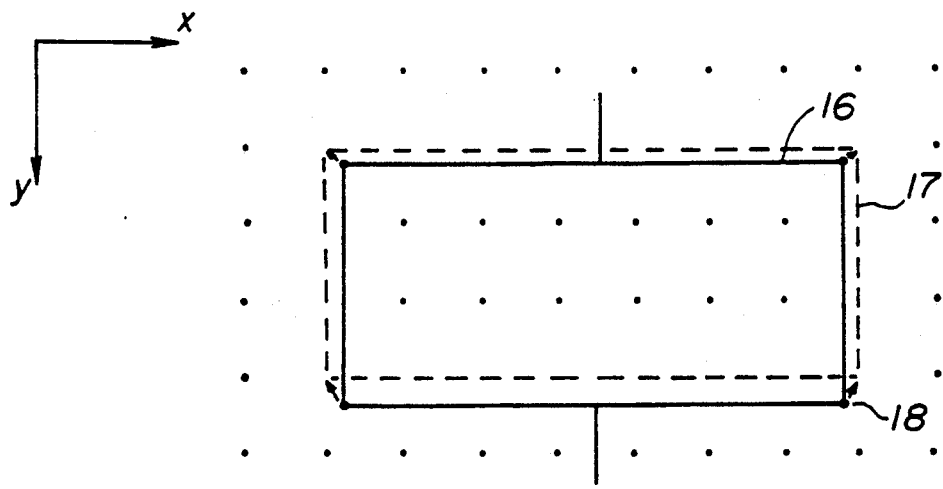
FIG. 12 is a diagram showing an input image and an output image produced when a size adjusting procedure is performed.

FIG. 12 shows such a symbol size adjusting process performed by the size adjusting part 11 of the second embodiment. In FIG. 12, an input rectangular graphic image 16 indicated by a solid line, an output rectangular graphic image 17 indicated by a dotted line, and an edge point 18 of the rectangle image whose position is adjusted so as to accord with the nearest grid point, are shown. When the symbol size adjusting process is performed, the input image 16 is converted to the output image 17 such that the position of each of the edge points is aligned so as to accord with the position of the nearest grid point.

Figure 13:
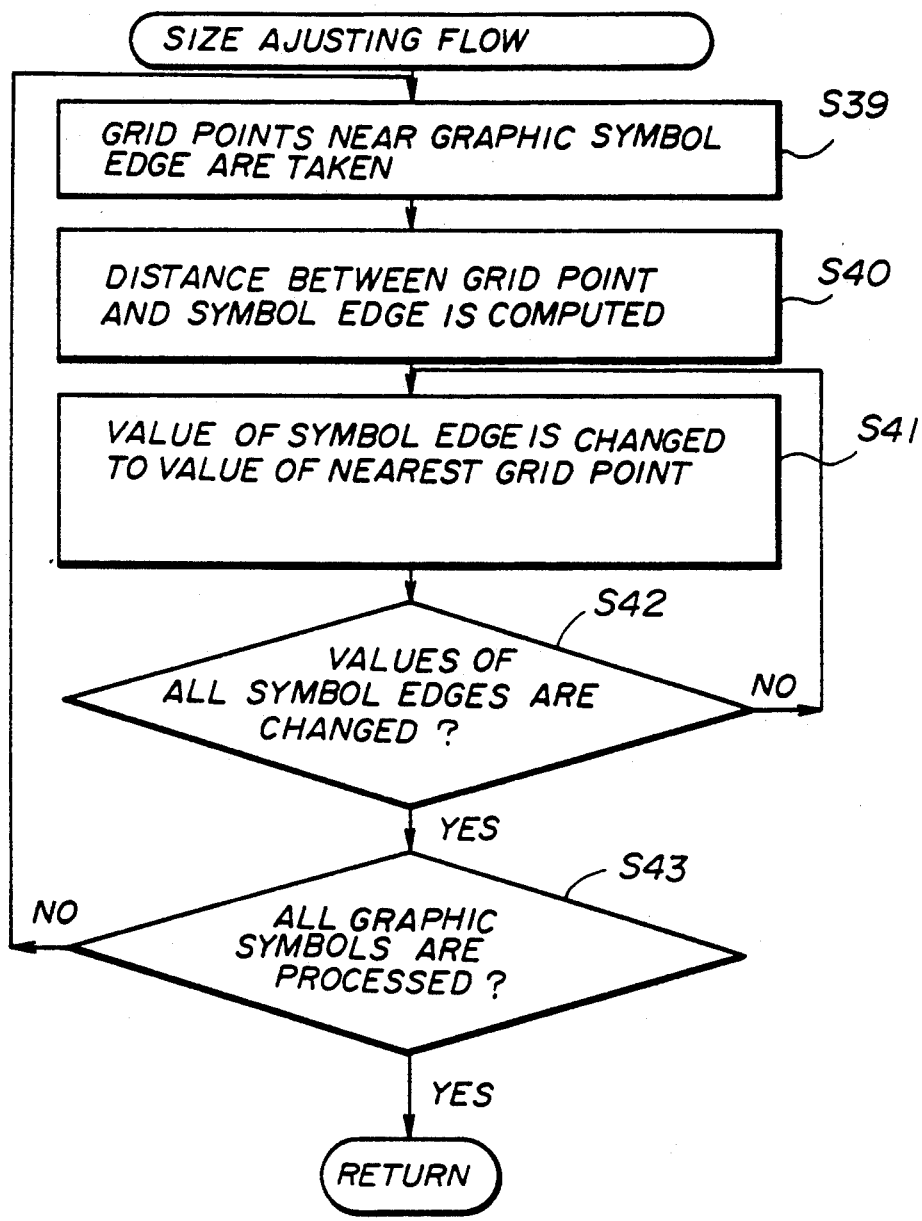
FIG. 13 is a flowchart for explaining the size adjusting procedure as shown in FIG. 12.

FIG. 13 shows the symbol size adjusting process as shown in FIG. 12. In step S39, the coordinate values of each edge point of the input graphic image, and the coordinate values of each of nearby grid points located in the vicinity of the edge point are taken. In step S40, the distances between the symbol edge point and the nearby grid points are computed. The distances are easily determined from the coordinate values of the symbol edge point and the coordinate values of each grid point taken in step S39. In step S41, the coordinate values of the nearest grid point are determined from the distances computed in step S40, and the coordinate values of the symbol edge point are changed to the determined coordinate values of the nearest grid point. Step S42 detects whether or not all the positions of the edge points of the graphic symbol have been changed. If the answer to the step S42 is negative, the step S41 is repeated. If the answer to the step S42 is affirmative, step S43 detects whether or not all the graphic symbols in the input image have been processed to change the positions of the edge points to the nearest grid point. If the answer to the step S43 is negative, the steps S39 through S42 are repeated. If the answer to the step S43 is affirmative, the symbol size adjusting process ends.

Figure 14:
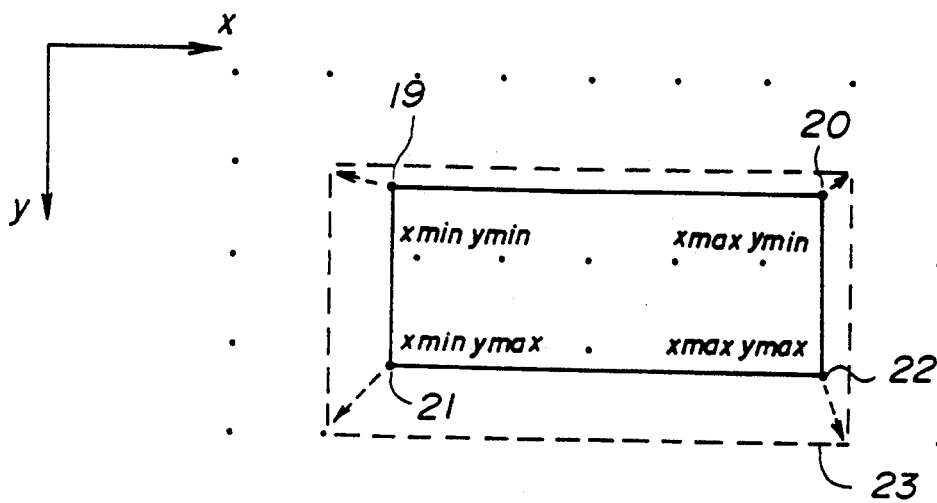
FIG. 14 is a diagram showing an input image and an output image produced when a modified size adjusting procedure is performed.

FIG. 14 shows a modified symbol size adjusting process in which the symbol size adjusting process shown in FIGS. 12 and 13 is modified. In the modified symbol size adjusting process shown in FIG. 14, the coordinate values of the edge points of each graphic symbol are different from the maximum x and y coordinate values of the graphic symbol and from the minimum x and y coordinate values thereof taken from the buffer memory. In FIG. 14, four edge points 19 through 22 of an input rectangular graphic image are indicated by a solid line, and an output rectangular graphic image 23 is indicated by a dotted line. When the modified symbol size adjusting process is performed, the input image is changed to the output image 23 in a manner such that the position of each of the edge points corresponding to the maximum coordinate value of the symbol accords with the position of the nearest grid point having a coordinate value greater than the maximum coordinate value, and such that the position of each of the edge points corresponding to the minimum coordinate value of the symbol accords with the position of the nearest grid point having a coordinate value smaller than the minimum coordinate value.

Figure 15:
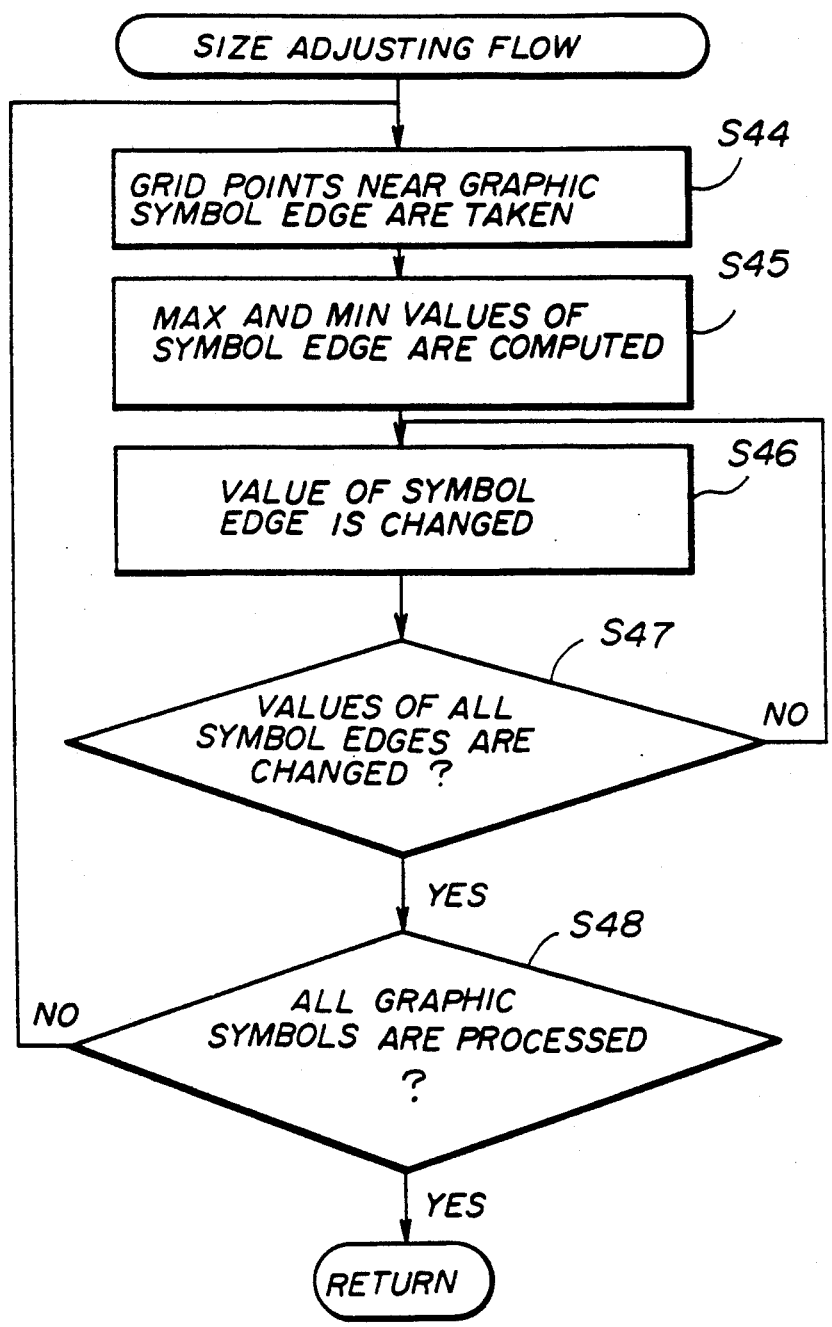
FIG. 15 is a flowchart for explaining the modified size adjusting procedure as shown in FIG. 14.

FIG. 15 shows the modified symbol size adjusting process as shown in FIG. 14. Steps S44, S47, and S48 shown in FIG. 15 are the same as those corresponding steps shown in FIG. 13, and a description thereof will be omitted. In step S45, the maximum x and y coordinate values of each graphic symbol in the input image and the minimum x and y coordinate values of the graphic symbol are taken from the buffer memory. The coordinate values of nearby grid points located in the vicinity of each edge point of the graphic symbol are taken in step S44. In step S46, the position of each edge point of the graphic symbol corresponding to the maximum x coordinate value of the graphic symbol is changed to the position of the nearest grid point which is detected from among the nearby grid points having an x coordinate value greater than the maximum x coordinate value. Similarly, the position of each edge point corresponding to the maximum y coordinate value is changed in this manner. Also, in step S46, the position of each edge point of the symbol corresponding to the minimum x coordinate value of the symbol is changed to the position of the nearest grid point which is detected from among the nearby grid points having an x coordinate value smaller than the minimum x coordinate value. Similarly, the position of each edge point of the symbol corresponding to the minimum y coordinate value is changed in this manner.

Further, the present invention is not limited to the above described embodiments, and variations and modifications may be made without departing from the scope of the present invention.

What is claimed is:

1. An image processing apparatus for processing an input graphic image to generate an image with a number of graphic symbols whose centers are aligned with each other and whose sizes are adjusted to accord with each other, said image processing apparatus comprising:

first transforming means for transforming an input graphic image into a plurality of vectors defining a plurality of graphic symbols in the input graphic image, each vector having coordinates indicating positions of two end points of each vector, and a width indicating a line width of the vector;

first storage means for storing the plurality of vectors produced by said first transforming means;

recognizing means for recognizing a configuration of each graphic symbol in the input graphic image from said plurality of vectors stored in said first storage means, said recognizing means producing a set of symbol parameters with respect to each graphic symbol whose configuration is recognized, said set of symbol parameters indicating at least a type of each graphic symbol, a center position thereof, a height thereof, and a width thereof;

second storage means for storing said set of symbol parameters produced by said recognizing means;

aligning means for taking a group of graphic symbols with the symbol parameters which respectively indicate center positions falling within a predetermined range, from said second storage means, and for aligning the center of each graphic symbol of said group so as to accord with an average value of the center positions of the symbols of the group in said second storage means;

size adjusting means for taking a group of graphic symbols with the symbol parameters which respectively indicate heights and widths falling with a predetermined range, from said second storage means, and for adjusting a height and width of each graphic symbol of said group so as to accord with an average height and width of the symbols of the group in said second storage means; and output means for outputting a graphic image generated by said aligning means and said size adjusting means.

2. An image processing apparatus according to claim 1, comprising:

means for replacing each of a plurality of original graphic symbols of the input graphic image with across mark before said center of each graphic symbol of said group is aligned by said aligning means; and means for replacing each said cross mark with the original graphic symbol of the input graphic image after said alignment is performed.

3. An image processing apparatus according to claim 1, wherein the size adjusting means includes:

means for adjusting a size of each graphic symbol of said group so as to accord with a maximum size of the symbols of the group.

4. An image processing apparatus for processing an input graphic image to generate an image with a number of graphic symbols whose centers are aligned with each other and whose sizes are adjusted to accord with each other, said image processing apparatus comprising:

reading means for reading an image from a document by raster scanning;

discrimination means for detecting a graphic image from the image read by said reading means;

first transforming means for transforming a graphic image, detected by said discrimination means, into a plurality of vectors defining a plurality of graphic symbols of an input graphic image, each vector having coordinates indicating positions of two end points of each vector, an angle indicating an angular direction of the vector, and a width indicating a line width of the vector;

first storage means for storing the plurality of vectors produced by said first transforming means;

recognizing means for recognizing a configuration of each graphic symbol of the input graphic image from said plurality of vectors stored in said first storage means, said recognizing means producing a set of symbol parameters with respect to each graphic symbol whose configuration is recognized, said set of symbol parameters indicating at least a type of each graphic symbol, a center position thereof, a height thereof, and a width thereof;

second storage means for storing said set of symbol parameters produced by said recognizing means;

aligning means for taking a group of graphic symbols with the symbol parameters which respectively indicate center positions falling within a predetermined range, from said second storage means, and for aligning the center of each graphic symbol of said group so as to accord with an average value of the center positions of the symbols of the group in said second storage means;

size adjusting means for taking a group of graphic symbols with the symbol parameters which respectively indicate heights and widths falling within a predetermined range, from said second storage means, and for adjusting a height and width of each graphic symbol of said group so as to accord with an average height and width of the symbols of the group in said second storage means; and output means for outputting an image produced by said aligning means and said size adjusting means.

5. An image processing apparatus according to claim 4, wherein the aligning means includes:

means for changing a center position of each graphic symbol of the group to a position of a nearest grid point among a predetermined array of grid points in the input graphic image, said nearest grid point being substantially located nearest to said center position of the graphic symbol, said array of grid points being horizontally and vertically pre-arranged with uniform distances therebetween.

6. An image processing apparatus according to claim 4, wherein said size adjusting means includes:

means for adjusting a height and width of each graphic symbol of said group in a manner such that a position of an edge point of each graphic symbol of said group is changed to a position of a nearest grid point among a predetermined array of grid points in the input graphic image, said nearest grid point being substantially located nearest to said edge point, said array of grid points being horizontally and vertically pre-arranged with uniform distances therebetween.

7. An image processing apparatus according to claim 4, wherein said size adjusting means includes:

means for adjusting a height and width of each graphic symbol of said group in a manner such that;

1) a position of an edge point of the graphic symbol corresponding to a maximum coordinate value of said graphic symbol is changed to a position of a nearest grid point among a predetermined array of grid points in the input graphic image, said nearest grid point being substantially located nearest to said edge point and having a coordinate value greater than the maximum coordinate value, said array of grid points being horizontally and vertically pre-arranged with uniform distances therebetween, and 2) a position of a second edge point of the graphic symbol corresponding to a minimum coordinate value of said graphic symbol is changed to a position of a nearest grid point among the array of grid points in the input graphic image, said nearest grid point being substantially located nearest to said second edge point and having a coordinate value smaller than the minimum coordinate value.

8. An image processing apparatus for processing an input graphic image to generate an image with a number of graphic symbols whose centers are aligned with each other and whose sizes are adjusted to accord with each other, said image processing apparatus comprising:

first transforming means for transforming an input graphic image into a plurality of vectors defining a plurality of graphic symbols in the input graphic image, each vector having coordinates indicating positions of two end points of each vector, and a width indicating a line width of the vector;

recognizing means for recognizing a configuration of each graphic symbol in the input graphic image from said plurality of vectors, said recognizing means producing a set of symbol parameters with respect to each graphic symbol whose configuration is recognized, said set of symbol parameters indicating at least a type of each graphic symbol, a center position thereof, a height thereof, and a width thereof;

aligning means for taking a group of graphic symbols with the symbol parameters which respectively indicate center positions falling within a predetermined range, produced from said recognizing means, and for aligning the center of each graphic symbol of said group so as to accord with an average value of the center positions of the symbols of the group provided by said recognizing means;

size adjusting means for taking a group of graphic symbols with the symbol parameters which respectively indicate heights and widths falling within a predetermined range, produced from said recognizing means, and for adjusting a height and width of each graphic symbol of said group so as to accord with an average height and width of the symbols of the group produced from said recognizing means; and output means for outputting a graphic image generated by said aligning means and said size adjusting means.

9. An image processing apparatus according to claim 8, comprising:

means for replacing each of a plurality of original graphic symbols of the input graphic image with a cross mark before said center of each graphic symbol of said group is aligned by said aligning means; and means for replacing each said cross mark with the original graphic symbol of the input graphic image after said alignment is performed.

10. An image processing apparatus according to claim 8, wherein the size adjusting means includes:

means for adjusting a size of each graphic symbol of said group so as to accord with a maximum size of the symbols of the group.

11. An image processing apparatus for processing an input graphic image generate an image with a number of graphic symbols whose centers are aligned with each other and whose sizes are adjusted to accord with each other, said image processing apparatus comprising:

first transforming means for transforming the input graphic image into a plurality of vectors defining a plurality of graphic symbols in the input graphic image, each vector having coordinates substantially defining each vector;

recognizing means for recognizing a configuration of each graphic symbol in the input graphic image from said plurality of vectors, and for producing a set of symbol parameters with respect to each graphic symbol whose configuration is recognized, said set of symbol parameters indicating at least a position and a size thereof;

aligning means for taking a group of graphic symbols with the symbol parameters which respectively indicate center positions falling within a predetermined range, produced from said recognizing means, and for aligning a center of each graphic symbol of said group so as to accord with an average value of center positions of the symbols of the group provided by said recognizing means;

size adjusting means for taking a group of graphic symbols with the symbol parameters which respectively indicate sizes falling within a predetermined range, produced from said recognizing means, and for adjusting a size of each graphic symbol of said group so as to accord with an average size of the symbols of the group produced from said recognized means; and output means for outputting a graphic image generated by said aligning means and said size adjusting means.

12. An image processing apparatus according to claim 11, comprising:

means for replacing each of a plurality of original graphic symbols of the input graphic image with a mark before said position of each graphic symbol of said group is aligned by said aligning means; and means for replacing each said mark with the original graphic symbol of the input graphic image after said alignment is performed.

13. An image processing apparatus according to claim 11, wherein the size adjusting means includes:

means for adjusting a size of each graphic symbol of said group so as to accord with a maximum size of the symbols of the group.

* * * * *

UNITED STATES PATENT AND TRADEMARK OFFICE
CERTIFICATE OF CORRECTION

PATENT NO. : 5,293,469
DATED     : March 8, 1994
INVENTOR(S) : Outa et al.

It is certified that error appears in the above-identified patent and that said Letters Patent is hereby corrected as shown below:

On the Title Page, item [54];

"WHOSE CENTERS AND ALIGNED WITH"

should be

--WHOSE CENTERS ARE ALIGNED WITH--.

column 1, line 4,

"AND" (first occurrence) should be --ARE--.

Signed and Sealed this

Twenty-third Day of August, 1994

Attest:

BRUCE LEHMAN

*Attesting Officer*     *Commissioner of Patents and Trademarks*